United States Patent [19]
Bell

[11] 4,243,264
[45] Jan. 6, 1981

[54] RECLINING SEAT LATCH

[75] Inventor: Robert L. Bell, Oxford, Mich.

[73] Assignee: Fisher Corporation, Troy, Mich.

[21] Appl. No.: 19,377

[22] Filed: Mar. 12, 1979

[51] Int. Cl.³ .............................................. A47C 1/025
[52] U.S. Cl. .................................... 297/367; 297/375; 297/379
[58] Field of Search ............... 297/375, 374, 378, 379, 297/354, 355, 363–369, 216; 16/139, 140; 292/265–267; 188/67; 74/540–542

[56] References Cited
U.S. PATENT DOCUMENTS

| 535,999 | 3/1895 | Sargent | 297/375 |
|---|---|---|---|
| 625,020 | 5/1899 | Chappnis | 188/67 X |
| 2,066,901 | 1/1937 | Preble | 297/363 X |
| 2,692,788 | 10/1954 | Willis | 292/267 |
| 3,001,821 | 9/1961 | Marechal | 297/366 |
| 3,999,247 | 12/1976 | Cremer | 297/379 X |
| 4,010,979 | 3/1977 | Fisher et al. | 297/379 |
| 4,143,913 | 3/1979 | Rumpf | 297/379 |

FOREIGN PATENT DOCUMENTS

| 2641587 | 3/1978 | Fed. Rep. of Germany | 297/379 |
|---|---|---|---|
| 1433788 | 4/1976 | United Kingdom | 297/368 |

Primary Examiner—William E. Lyddane
Attorney, Agent, or Firm—Harness, Dickey & Pierce

[57] ABSTRACT

The disclosure relates to a latch mechanism for controlling reclining movement of a vehicle seat back. A pair of spring loaded latches are engageable with an articulated slidable link to latch the seat at a desired reclining position. The latches are manually movable to an unlatched condition relative to the link at which time the link "floats" therebetween.

8 Claims, 5 Drawing Figures

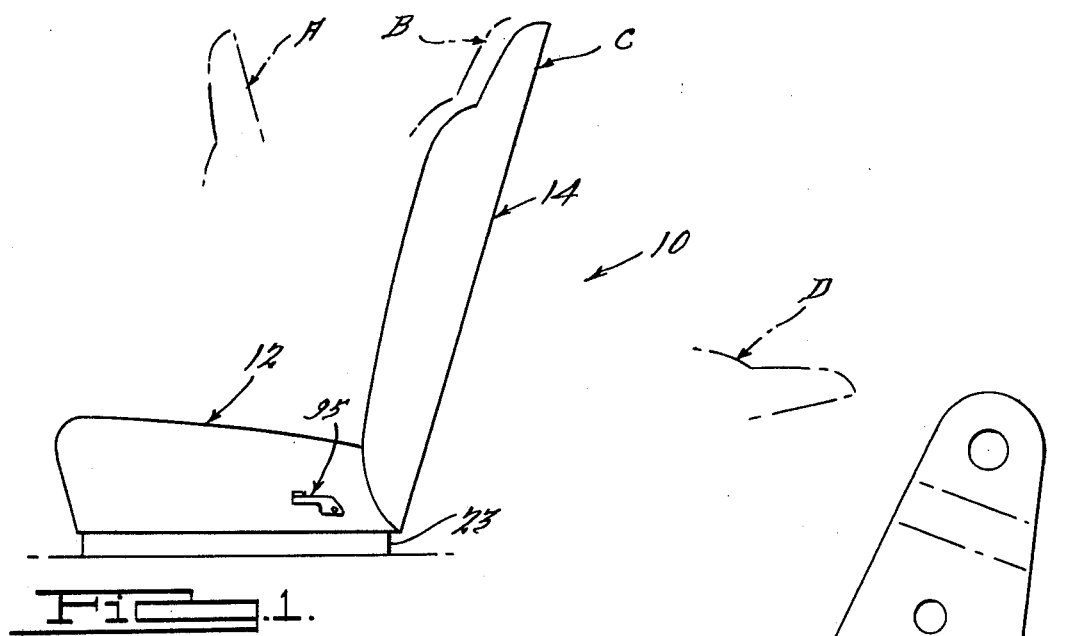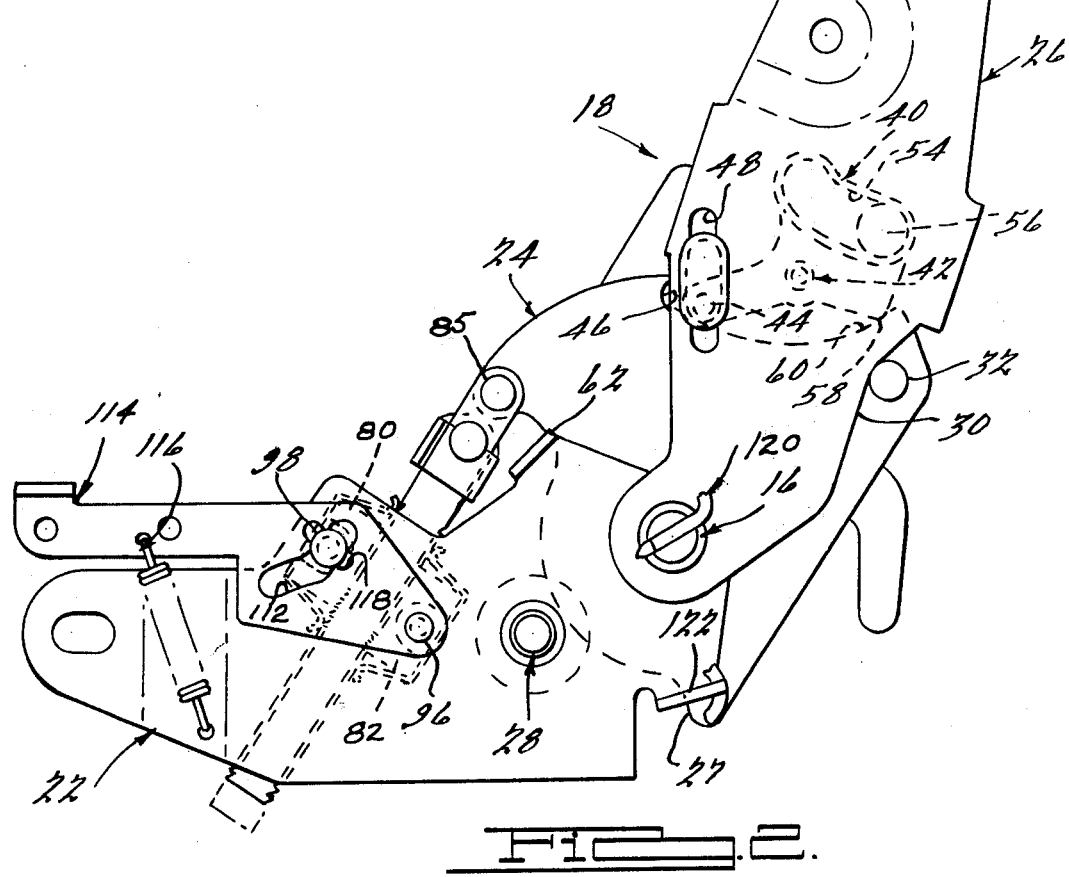

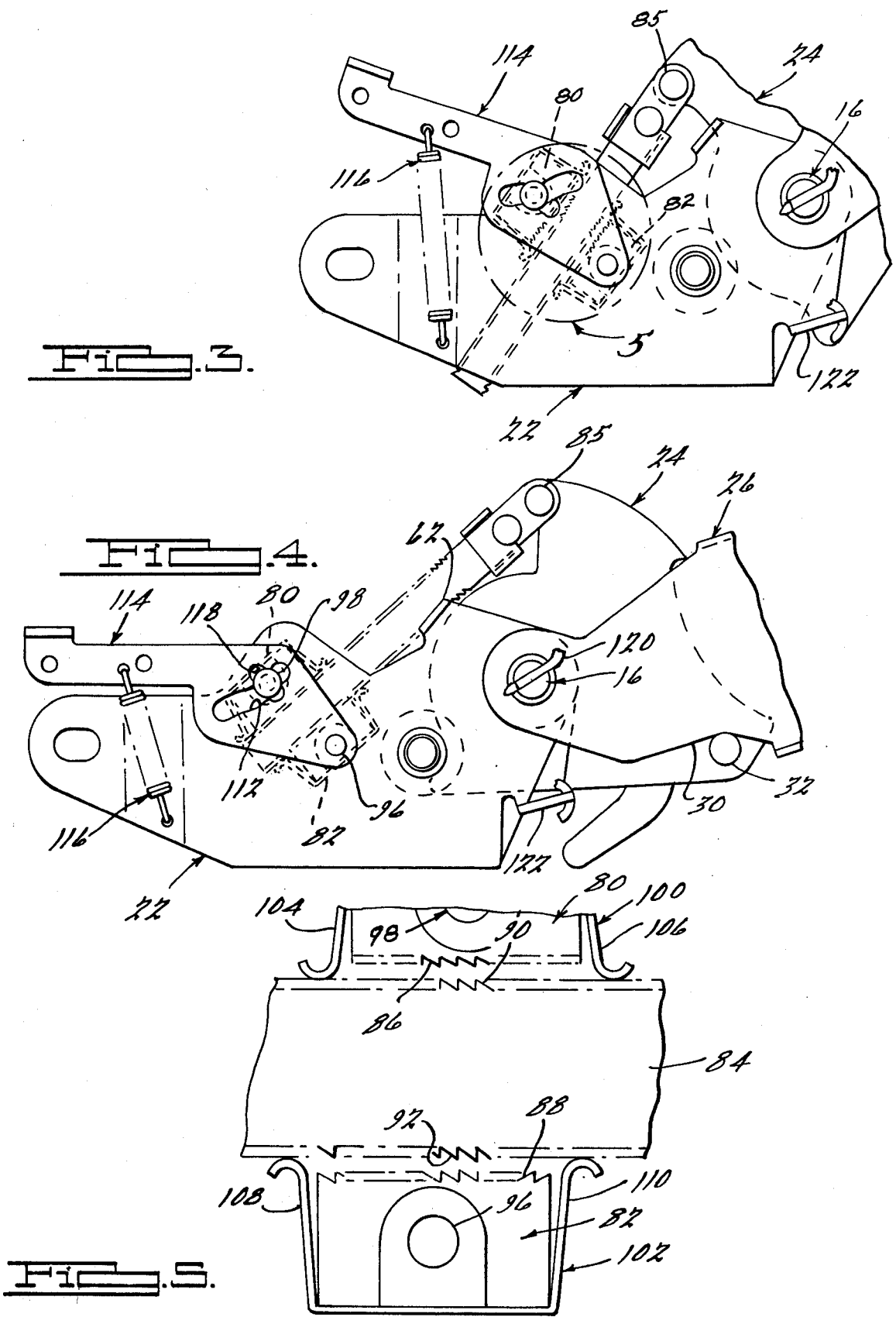

RECLINING SEAT LATCH

BACKGROUND OF THE INVENTION

Manually operated latch mechanisms for retaining a reclinable back of a vehicle seat in a desired position are known. However, there is constant pressure on the automotive industry to provide latch mechanisms that are more positive, more accessible, lighter, and less expensive than known latch mechanisms.

SUMMARY OF THE INVENTION

A latch mechanism for a vehicle seat in accordance with the instant invention comprises a seat cushion bracket attachable to the seat cushion portion of a vehicle seat. A seat back bracket is attached to the seat back of the seat and is joined and supported for rotation relative to the seat cushion bracket by a pivot pin. A quadrant is supported by the pivot pin for rotation relative to both the seat cushion bracket and the seat back bracket. A slidable link having oppositely directed teeth is pivotally connected to the quadrant at a point radially spaced from the pivot pin thereof so as to be articulated relative thereto as well as to be reciprocable and adjustable relative to a pair of manually controlled latches mounted on the seat cushion bracket. The latches are engageable with the link for controlling rotation of the seat back. Springs effect "float" of the link when the latches are disengaged therefrom.

BRIEF DESCRIPTION OF THE DRAWINGS

FIG. 1 is a schematic side elevational view of a vehicle seat embodying the instant invention;

FIG. 2 is an enlarged side elevational view, with the seat cover broken away and other portions removed, of the seat shown in FIG. 1, showing the details of the latch mechanism;

FIG. 3 is a view similar to FIG. 2 showing the latches in the unlatched condition;

FIG. 4 is a side elevational view, similar to FIG. 2, showing the seat back in the latched and fully reclined position;

FIG. 5 is an enlarged view taken within the circle "5" of FIG. 3 showing the latches and link in the unlocked or "float" condition.

DETAILED DESCRIPTION OF THE PREFERRED EMBODIMENT

Referring to the drawings, FIG. 1 shows, in schematic fashion, a vehicle seat assembly 10, incorporating a latch mechanism in accordance with the present invention. The seat assembly 10 is of the type conventionally found in the front seat of two-door motor vehicles and comprises a seat cushion 12 and a seat back 14.

Referring to FIG. 2, wherein the upholstery of the seat cushion 12 and seat back 14 has been deleted and only the structural components necessary to an understanding of the invention have been illustrated, the seat back 14 is supported for pivotal movement relative to the seat cushion 12 as by a pin 16 so as to permit the seat back 14 to be folded forwardly to provide access to the rear seat of the associated vehicle as well as to be pivoted rearwardly to a desired reclining position.

A latch mechanism, indicated generally by the reference numeral 18, is provided for controlling reclining movement of the seat back 14, for preventing undesired forward pivotal movement of the seat back 14 due to sudden vehicle decelerations, and for accommodating desired forward movement of the seat back 14 to facilitate access to the rear seat of a motor vehicle.

More specifically, a seat cushion bracket 22 is affixed to an underlying frame 23 of the seat cushion 12. The bracket 22 journals the pin 16 which is secured to a quadrant 24 for a reason to be discussed. The pin 16 is also journaled in a seat back bracket 26. Thus, the quadrant 24 and the pin 16 are journaled for rotation relative to the seat cushion bracket 22 as well as to the seat back bracket 26.

Clockwise or reclining rotation of the quadrant 24 relative to the seat cushion bracket 22 is stopped after a predetermined angular displacement by engagement of a stop 27 on the quadrant 24 with the pin 28. Clockwise rotation of the seat back bracket 26 relative to the quadrant 24 is stopped by engagement of an edge portion 30 of the bracket 26 with a pin 32 on the quadrant 24.

As best seen in FIG. 2, and as more fully described in my copending application entitled Reclining and Emergency Latch Mechanism for Vehicle Seats, filed Sept. 28, 1978, Ser. No. 946,510, which is incorporated herein by reference, an inertia member cage 40 is supported for rotation relative to the seat back bracket 26 by a pivot pin 42. The inertia member cage 40 carries a transversely extending latch pin 44 that is adapted to cooperate with a shoulder 46 on the quadrant 24 and the edges of a slot 48 in the seat back bracket 26 to limit forward rotation of the seat back 14 upon the occurrence of sudden deceleration of the vehicle.

The inertia member cage 40 is formed with an internal track 54 for the acceptance of a generally disc-shaped inertia member 56 which is rollable therealong, as will be described.

FIG. 2 shows the latch mechanism 18 in its normal or latched and upright condition denoted by the full line position "c" in FIG. 1. In this condition, the inertia member 56 is positioned to the right of the pivot pin 42 that supports the cage 40 in which position the weight of the inertia member 56 causes the inertia member cage 40 to be biased clockwise. Clockwise rotation of the inertia member cage 40 is limited by engagement of a shoulder 58 thereon with an abutment 60 on the quadrant 24 thereby normally maintaining the pin 44 in arcuate alignment with the shoulder 46 on the clutch quadrant 24 so as to be engageable therewith.

Upon the occurrence of sudden vehicle deceleration, the inertia member 56 rolls along the track 54 effecting a counterclockwise bias on the inertia member cage 40 thereby holding the pin 44 at the lower end of the slot 48 so that it is maintained in a position to engage the shoulder 46 on the quadrant 24. Thus, forward pivotal movement of the seat back bracket 26 relative to the quadrant 24 and the seat cushion bracket 22 is stopped at the broken line position "B" of FIG. 1, assuming the quadrant 24 is latched relative to the seat bracket 22, as will be described.

The inertia member cage 40 is positively held in the aforesaid latched position by the inertia member 56 until deceleration ceases whereupon the inertia member 56 returns to the position shown in FIG. 2. While the bias on the inertia member cage 40 reverses when the seat back 14 moves from the "B" position to the "C" position of FIG. 1, the pin 44 on the inertia member cage 40 is maintained in the locked position shown in FIG. 2, due to engagement of the boss 58 thereon with the abutment 60 on the clutch quadrant 24. Thus, the seat back 14 is normally maintained in the latched condition.

When the vehicle is in the static condition and it is desired to move the seat back 14 forward relative to the seat 12 to the broken line position "A" in FIG. 1, thereby to facilitate access to the rear seat of the vehicle, the first increment of rotation of the seat back 14 towards the "B" position of FIG. 1, permits the inertia member cage 40 to rotate clockwise under the clockwise bias of the inertia member 56. When the cage 40 rotates clockwise, the pin 44 is raised within the slot 48 in the bracket 26 so as to clear the shoulder 46 on the quadrant 24 permitting the seat back 14 to be pivoted forwardly to the "A" position against the stop 62. Thus, the pin 44 is automatically moved out of the normal or latched condition to accommodate forward movement of the seat back 14 when no deceleration forces are operative on the vehicle. At such time the inertia member 56 remains at the right or lowermost portion of its track 54 thereby to exert a clockwise bias on the inertia member cage 40.

In accordance with the instant invention, latching of the seat back 14 at a desired reclining position intermediate the end positions thereof, is achieved by latching of the quadrant 24 relative to the seat cushion bracket 22 and seat 12 due to engagement of a pair of latches 80 and 82 with a reciprocable articulated link 84. The latches 80 and 82 are supported by the seat cushion bracket 22. The link 84 is pivotally secured to the quadrant 24 by a pin 85.

The latches 80 and 82 have toothed portions 86 and 88, respectively, which engage complimentary toothed portions 90 and 92 on the link 84 in meshing engagement.

It is to be noted that the teeth 86 and 88 on the latches 80 and 82, respectively, are of buttress configuration and of opposite orientation so that when engaged with complimentary buttress teeth 90 and 92 on the link 84, respectively, reciprocal movement of the link 84 in either direction longitudinally thereof is positively stopped.

The latch 82 is supported by a fixed pin 96 on the seat bracket 22 while the latch 80 is supported by a movable pin 98. The latches 80 and 82 are biased to the unlocked condition relative to the link 84 by U-shaped springs 100 and 102, respectively. The springs 100 and 102 have legs 104–106 and 108–110, respectively, that have a self bias toward one another to push the link 84 away from the latches 80 and 82 and thereby "float" the link 84 therebetween.

In the normal locked condition the movable pin 98 is biased toward the pin 96 by interaction of the wall of a slot 112 in a manual operator 114 with the pin 98. The manual operator is normally biased counterclockwise toward the locked condition by a spring 116 which is sufficiently strong to overcome the self-bias of the leg portions 104–106 and 108–110 of the springs 100 and 102, thereby to deflect the legs 104–106 and 108–110 away from one another to effect engagement of the teeth 86 on the latch 80 with the teeth 90 on the link 84, as well as engagement of the teeth 88 on the latch 82 with the teeth 92 on the link 84.

To effect unlocking of the seat back 14 and reclining movement thereof, the manual operator 114 is rotated clockwise about the pin 96 thereby carrying the pin 98 upwardly in a slot 118 in the seat bracket 22 due to interaction of the sidewall of slot 112 in the manual operator 114 with the pin 98. Movement of the pin 98 upwardly frees the teeth 86 on the latch 80 from the teeth 90 on the link 84. The self bias of the legs 104 and 106 on the spring 100 pushes the link 84 away from the latch 80. Similarly, the link 84 is now free to move away from the latch 82 under the self-bias of the legs 108 and 110 on the spring 102 thereby to disengage the teeth 92 on the link 84 from the teeth 88 on the latch 82. The link 84 thereupon "floats" between the latches 80 and 82 on the ends of the legs 104–106 and 108–110 of the springs 100 and 102 which are sufficiently strong to maintain such "float" on the link 84 when the manual operator is held in the unlocked position.

Return movement of the seat back 14 is initiated in a similar manner by releasing the latches 80 and 82 due to clockwise movement of the manual operator 114. Movement of the seat back 14 is effected by the bias of a spirally wound spring 120 which extends between a flange 122 on the seat bracket 22 and the pin 16 on the quadrant 24. The pin 16 and quadrant 24 rotate the seat back bracket 26 counterclockwise due to engagement of the pin 32 on the quadrant with rear edge 30 of the seat back bracket 26.

While it will be apparent that the preferred embodiments of the invention disclosed are well calculated to fulfill the objects above stated, it will be appreciated that the invention is susceptible to modification, variation and change without departing from the proper scope of fair meaning of the subjoined claims.

What is claimed is:

1. A latch mechanism for controlling rotation of a vehicle seat back to a reclining position relative to a vehicle seat, said mechanism comprising
    a pivot pin joining said seat and seat back for relative rotation,
    a quadrant supported by said pivot pin for rotation relative to both said seat and seat back,
    stop means on said quadrant for defining the position of said seat back relative to said quadrant, and,
    a link extending between said seat and said quadrant for controlling the position of said quadrant, said link being pivotally connected to said quadrant at a point radially spaced from said pivot pin and having spaced teeth on opposite sides thereof,
    a pair of spaced latches on said seat having teeth complementary to the teeth of said link, said latches being movable relative to said link to effect engagement and release thereof, whereby said link is locked against movement when said latches are engaged therewith and movable when released to position said quadrant and seat back at a desired rotational position relative to said seat, and
    spring means extending between each of said latches and said link for biasing said link away from said latches.

2. A latch mechanism in accordance with claim 1, wherein the teeth on opposite sides of said link are of buttress configuration and are oppositely directed whereby said latches effect positive locking of said link against movement in either direction when engaged therewith.

3. A latch mechanism in accordance with claim 1 including means mounting one of said latches on said seat for rotation relative thereto and means mounting the other of said latches for rotation and translation relative to said seat.

4. A latch mechanism in accordance with claim 3 including a manual operator on said seat for effecting movement of said last mentioned means.

5. A latch mechanism for controlling rotation of a vehicle seat back to a reclining position relative to a vehicle seat, said mechanism comprising a pivot pin joining said seat and seat back for relative rotation, means rotatable about said pivot pin with said seat back towards the reclining position for controlling the position of said seat back, a link extending between said seat and said means for controlling the position thereof and said seat back, said link being pivotally connected to said means at a point radially spaced from said pivot pin and having spaced teeth on opposite sides thereof, first and second spaced latches having teeth complementary to the teeth of said link, said latches being movable relative to said link to effect engagement and release thereof, whereby said link is locked against movement when said latches are engaged therewith and movable when released to position said means and seat back at a desired rotational position relative to said seat, the teeth on opposite sides of said link being of buttress configuration and oppositely directed whereby said latches effect positive locking of said link against movement in either direction when engaged therewith, a first fixed pin on said seat supporting said first latch for rotation, a manual operator, a second movable pin supported by said manual operator and journaling said second latch for rotation, said manual operator being pivoted on said first pin for effecting movement of said second pin and second latch relative to said first latch and said link, and link control means for positioning said link relative to said latches, said link control means being movable by said second pin and having spaced fingers on opposite sides of said second latch slidably engageable with the teeth on said link for moving said link towards said first latch.

6. A latch mechanism for controlling rotation of a vehicle seat back to a reclining position relative to a vehicle seat, said mechanism comprising a seat bracket attachable to said vehicle seat, a seat back bracket attachable to said vehicle seat back, a pivot pin joining said seat bracket and seat back brackets for relative rotation, a quadrant supported by said pivot pin for rotation relative to both said seat bracket and seat back bracket, stop means on said quadrant for limiting rotation of said seat back bracket relative to said quadrant, a link extending between said seat bracket and said quadrant for controlling the rotative position of said quadrant relative to said seat bracket, said link being pivotally connected to said quadrant at a point radially spaced from said pivot pin, means on said seat bracket for controlling the position of said link comprising a first latch on one side of said link, a first fixed pin on said seat bracket supporting said first latch solely for rotation relative to said seat bracket and link, a second latch on the opposite side of said link, a second movable pin supporting said second latch for rotation and translation relative to said seat bracket and link, and a manual operator pivoted on said first pin and movable between a locked and an unlocked condition, movement of said manual operator from the locked to the unlocked condition effecting translation of said second pin and second latch relative to both said first latch and said link whereby said link is unlocked for movement relative to said latches to enable said quadrant and seat back bracket to be positioned at a desired rotational position relative to said seat bracket, said first latch having a spring biased portion constantly engaged with said link for biasing said link away from said first latch when said second pin and second latch are moved away from said first pin and latch.

7. A latch mechanism in accordance with claim 6 wherein said spring biased portion includes a pair of spaced fingers on opposite sides of said first latch slidably engageable with said link for moving said link towards said second latch.

8. A latch mechanism in accordance with claim 7 wherein said pair of spaced fingers position said link between said latches out of engagement with said link when said manual operator is moved to a release condition.

* * * * *